Figure 1:
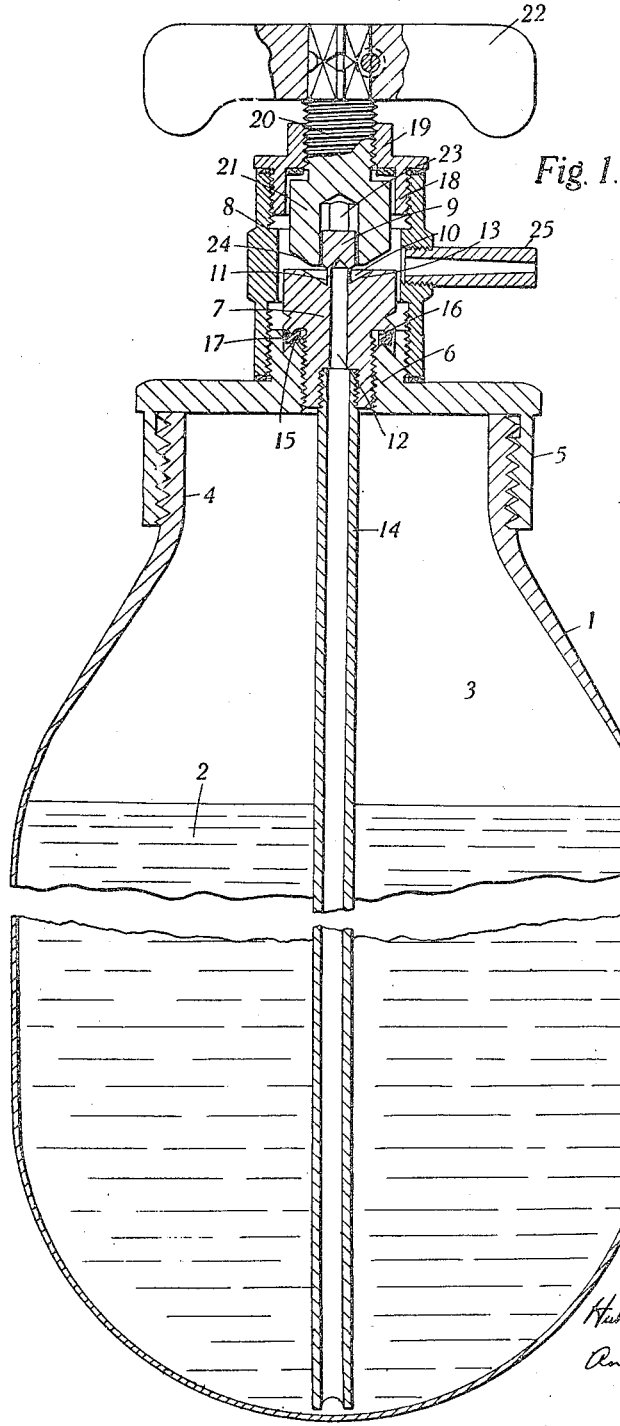

UNITED STATES PATENT OFFICE 2,236,960

STOPPERING AND DISCHARGE DEVICE FOR FLUID CONTAINERS

Hubert Mackenzie Salmond, Fareham, and Anders Mathisen, High Holborn, London, England Application October 23, 1939, Serial No. 300,834
In Great Britain December 30, 1938

6 Claims. (Cl. 221—73.5)

The invention relates to stoppering devices for containers for storing fluids under pressure, and particularly to such devices which are of a frangible nature and also constitute a discharge orifice for the container on being fractured to unstopper the container.

Containers for liquids or gases, and in particular, for fire extinguishing fluids such as methyl bromide, carbon tetra chloride or carbon dioxide, which are stoppered with devices incorporating a frangible element, normally discharge the whole of the contents of the container when once the frangible element has been destroyed.

A principal object of the invention is to provide in such stoppered containers means permitting reclosure of the discharge device so that the amount of fluid discharged after fracture of the frangible element may be limited. Such means are of particular advantage in the case of containers of methyl bromide under pressure, as the unchecked discharge of this substance in a confined space such as an aircraft compartment may cause serious inconvenience to the aircraft personnel since the gas produced by methyl bromide on discharge is highly irritant and should not be inhaled.

Another object of the invention is to provide a container for storing fluid under pressure which is provided with a stoppering device comprising a frangible element having operating means associated therewith adapted on primary operation thereof to fracture said element and thereby effect discharge from the container, and on secondary operation thereof to close the orifice produced by fracturing the element.

Another object of the invention is to provide a frangible stoppering device which may be reclosed after fracture by forcing the fractured portions of the said device together.

A further object of the invention is to provide a frangible stoppering device in combination with operating means for fracturing the device, said operating means being arranged for reclosing the stoppering device after fracture, either by forcing together the fractured portions of the said device, or by means of a sealing portion provided on the operating means which can be brought into fluid-tight co-operation with a corresponding portion on the stoppering device to seal off the fractured portion of the device through which fluid discharges.

Yet another object of the invention is to provide operating means for fracturing the frangible portion of the stoppering device which operating means are provided with accommodation for the reception of the broken off portion of the device.

The above and other objects of the invention will be apparent from a consideration of the accompanying drawings which show a preferred constructional form of the stoppering device according to the invention as applied to the stoppering of a manually operable fire extinguisher of the kind in which fire extinguishing liquid is stored under gas pressure in a metal container.

In the drawings—

Figure 2:
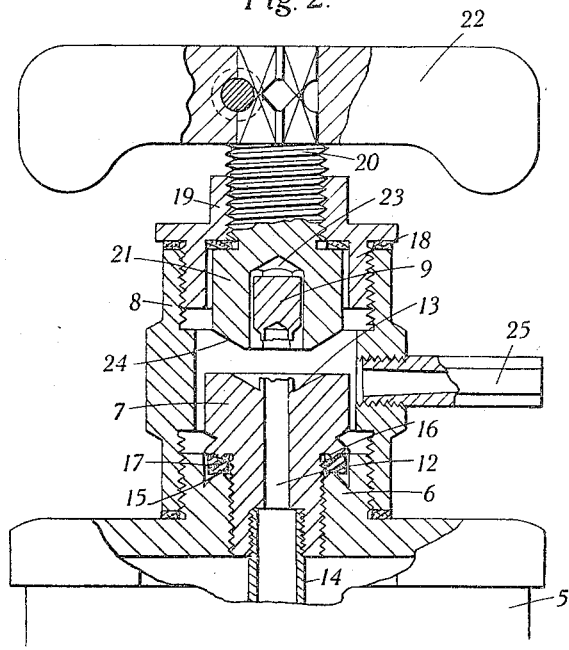
Figure 3:
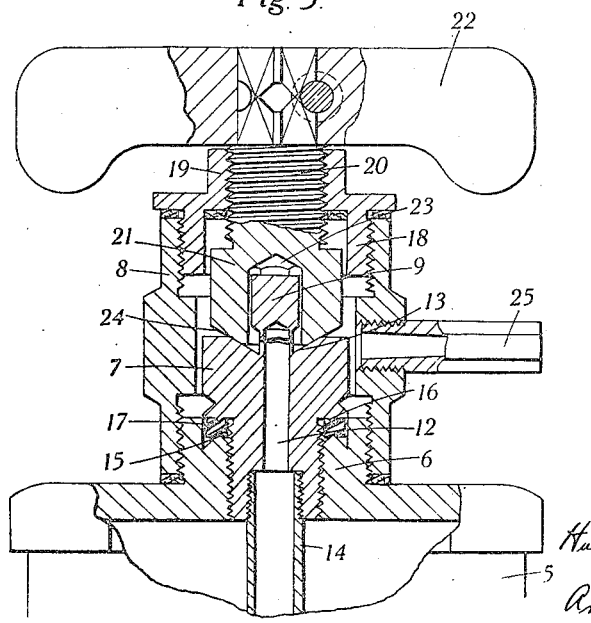

Figure 1 shows the extinguisher in vertical sectional elevation after stoppering and before use, Figure 2 shows the stoppering portion of the extinguisher after fracture of the seal and during discharge of the liquid under pressure, and Figure 3 shows the stoppering portion of the extinguisher after reclosure of the discharge orifice.

Similar parts in all the figures are denoted by the same numerals.

Referring to the drawings, and particularly to Figure 1, the fire extinguishing liquid container comprises a solid drawn metal bottle 1 in which a quantity of methyl bromide 2 is stored under nitrogen 3 at a pressure of about 60 to 100 lbs. per square inch. The neck 4 of the bottle is screw-threaded and the mouth is closed by a flanged cap 5 which engages the threaded portion of the neck.

The cap 5 is provided with a central boss 6 which is screw threaded internally to receive a stoppering element 7, and is screw threaded externally for the reception of an internally threaded sleeve member 8.

The stoppering element 7 comprises a metal plug which is formed on its upper end with a hexagonal sectioned extension 9, this extension being undercut to form an inclined sided groove 10. The plug is bored at 12 concentrically from its lower face to within the hexagonal sectioned extension so as to form a thin annular metallic neck portion 11 concentric with the bore 12, and connecting the said extension to the body of the plug. The neck portion 11 is sufficiently thin to rupture when the extension 9 is twisted with respect to the plug by a manually applied tool, and when the extension is thus removed, an orifice is formed through which the contents of the bottle may be discharged, the mouth of this orifice being located at the centre of a conical seating 13 formed by the lower side of the groove 10.

The end of the bore 12 in the plug is enlarged and screw-threaded to accommodate the screwed upper end of a fluid delivery pipe 14 which extends to near the bottom end of the bottle 1 when the plug 7 is screwed down tight in the boss 6. In order to form a fluid-tight joint between the plug 7 and the boss 6, the upper end of the said boss is grooved internally concentrically, and the lower surface of the groove 15 is of inverted V-section, whilst the plug 7 is formed with a corresponding V-section flange 16, and a suitable washer 17 is interposed between the two oppositely arranged sharp edges of the V-sectioned parts, so that on tightening of the plug 7 into the boss 6, a fluid-tight joint is established between these parts.

The upper end of the sleeve member 8 is screw-threaded internally to accommodate a closure cap 18 which is provided with a concentric boss 19 having a screw-threaded bore extending concentrically therethrough. A threaded rod 20 passes through this bore and is formed on its inner end with an enlarged head 21, and on its outer end with flats on which is secured a handle 22 for manual operation.

The head 21 is formed in its lower face with a hexagonal sectioned recess 23 to receive the hexagonal sectioned extension 9 on the plug 7, the extension fitting the recess so that when the head is rotated by means of the handle 22, the extension 9 is also rotated thereby.

The lower face of the head 21 is coned as shown at 24 at a suitable angle so that when the rod 20 is screwed down by means of the handle 22, this conical face 24 coacts with the conical seating 13 at the upper end of the plug 7 and formed by the lower side of the groove 10, to provide a valve which can be closed in a fluid-tight manner.

The sleeve member 8 is formed intermediate its ends with a radially extending screwed passageway into which is screwed a discharge nozzle pipe 25, through which liquid discharged from the bottle is directed.

After the bottle 1 has been charged with the liquid and the requisite amount of gas has been introduced, the plug 7 is screwed down tightly into the boss 6 to form a fluid-tight joint, and the bottle thus remains with its charge of fire extinguishing fluid under the applied gas pressure until it is required for use.

When the liquid is required to be delivered, the handle 22 is rotated slightly, preferably in the direction to raise the head 21, so that the frangible portion 11 of the plug 7 is fractured as shown in Figure 2, and the sealing of the bottle thus broken.

Liquid 2 is then forced up the delivery pipe 14, and forces the broken off extension 9 further into the recess 23 in the head 21 so that a passageway is provided for the liquid between the face 13 of the groove 10 and the face 24 of the head 21, whereby it passes into the space in the sleeve member 8 and so out through the discharge nozzle pipe 25.

By manipulating the bottle, the jet of liquid issuing from the nozzle pipe 25 may be directed as required.

If it is not desired to discharge all the liquid in the bottle 1, the handle 22 may be screwed down to the position shown in Figure 3 to reclose the bottle when the required amount of liquid has been discharged. In this position, the rod 20 is screwed down by the external handle 22 until the conical face 24 of the head 21 seats in a fluid-tight manner on the conical seating formed by the face 13 at the upper end of plug 7. These coacting parts thus form an effective fluid-tight valve which may be opened or closed at will after severance of the frangible portion 11 of the plug 7, without risk of loss of liquid or gas pressure when the valve is closed.

Owing to the arrangement whereby the extension 9 is forced into the recess 23 on being broken off from the body of the plug 7, it is only necessary to rotate the handle 22 through about 5° to 10° to effect discharge of the extinguisher at full bore and under full gas pressure. The extinguisher may thus be operated conveniently by one hand, if necessary by holding the bottle 1 in one hand and striking the handle 22 a blow on a firm abutment tangentially of the bottle.

In a somewhat modified form of the arrangement above described, the extension 9 of the plug 7 may itself be used after severance from the body of the plug to effect reclosure of the bottle. In this arrangement, the head 21 is shaped so that when the extension 9 is forced into the recess 23, the lower end of the extension and its depending fractured portion of the neck 11 protrude below the lower face of the head. When it is desired to reclose the bottle after fracture of the plug, the handle 22 is screwed down until the two fractured portions of the neck 11 abut, after which further screwing down of the handle causes the fractured portions to score into one another and effect a fluid-tight seal. This seal may be broken again by unscrewing the handle 22 to separate the fractured portions of the neck.

In another modified form of the stoppering and discharge device, the head 21 may be secured to the sleeve 8, which is then arranged for rotation about the boss 6 to effect rupture of the frangible plug and subsequent reclosure and reopening of the bottle. In this arrangement, the handle 22 may be dispensed with and the nozzle pipe 25 used as the operating handle, it being quite practicable to effect severance of the extension 9 by striking the nozzle pipe a blow against a sharp edge or obstacle tangential to the axis of the bottle. The movement necessary for severance of the plug will not damage the thread or restrict the subsequent movement of the sleeve 8. Such a modified arrangement may incorporate a sealing element similar to the closure member 21 with the conical surface 24, or the scoring together of the ruptured portions of the neck 11 may be relied on to effect the desired fluid-tight joint on reclosure of the bottle.

In yet another modified form of the stoppering and discharge device, a plug fracturing head is secured to a gland which is rotatably mounted within the sleeve member 8. When it is required to discharge liquid from the bottle, the head is rotated in either direction by means of a handle secured to an external portion thereof to fracture the plug 7 and when it is desired to reclose the orifice formed by such movement, the sleeve member is screwed down onto the boss 6 preferably together with the handle and its attached plug fracturing head, so as to force the fractured portion of the plug back into its original position, and, if the handle is also rotated to score the fractured parts together. Subsequent discharge of liquid from the bottle can be effected by unscrewing the sleeve and the handle, these parts being again screwed down onto the boss 6 when the desired quantity of liquid has been delivered. In this modified form of the device, instead of relying upon the scoring together of the fractured parts of the plug to effect fluid-tight reclosure of the bottle, a closure member similar to the head 21 shown in the drawings may be employed.

In the arrangements in which the severed portion of the plug is scored into the remaining portion of the plug, the screw-thread in the cap 19, or in the case where the sleeve member is rotated to effect closure, the screw-thread in the sleeve is arranged to have a short lead, that is to say, the thread is fine in order that considerable force may be applied to the severed plug portion to force it into contact with the fixed plug portion.

It will be seen from the foregoing description that the invention provides a stoppering and discharge device for liquids under pressure in containers, such as fire extinguishing liquid containers, which may be operated quickly by one or both hands to effect immediate discharge of the liquid, as for example after a fire breaks out in an aircraft, and that also the arrangement enables the container to be quickly and efficiently closed again after sufficient fluid has been discharged to extinguish the fire. The minimum amount of methyl bromide is thus used for extinguishing the fire, and by this means inconvenience to the aircraft personnel may be avoided. Moreover the hand extinguisher will be available for repeated use should this prove necessary although normally after the sealing plug has been fractured, the extinguisher should be replaced as soon as practicable.

It will also be evident that the stoppering and discharge devices hereinbefore described by way of example may be modified within the scope of the invention.

In order to render the hand extinguishers accessible to users, these may be mounted upon a bracket device which is lined with felt or rubber material or the like, a spring urged or otherwise resiliently mounted pressure applying fitting being provided for clamping the extinguishers thereon, such that the extinguisher is readily removable if required.

Having thus fully described our invention, what we claim as new and desire to protect by Letters Patent is:

1. A stoppering device for a container, consisting of, a hollow metal plug secured in the container in a fluid tight manner to seal said container and having a bore formed therein communicating with the inside of said container, a thin frangible elongated neck portion connected at one end to said plug around said bore, an extension connected to the other end of said neck portion, means for fracturing off said extension to unseal said container, said means consisting of a head for engaging said extension, said head having a recess for receiving said extension, means for mounting said head for rotation axially of said plug, and means for reclosing said container, said last means consisting of complementary surfaces formed around said neck portion on said plug and around said recess on said head respectively, and including means for bringing said complementary surfaces together in sealing relation.

2. Stoppering device for a container comprising a cap for the mouth of the container, a concentric boss on said cap screw-threaded internally and externally, a metal plug engaging said internal screw-thread in a fluid-tight manner, said plug having a non-circular extension thereon which is undercut next the plug and being bored from the other end to within said extension to form a thin neck portion whereby said extension is connected to the body of the said plug, an internally screw-threaded sleeve member engaging said external screw-thread on said boss, a screw-threaded closure member for said sleeve member, a nozzle pipe connected to discharge from said sleeve member, and means rotatably mounted in said closure member for fracturing said extension off said plug and opening said bore to unseal the container and thereafter reclosing the bore in said plug to reseal the said container.

3. Stoppering device for a container, comprising a cap for the mouth of the container, a concentric hollow boss on said cap screw-threaded internally and externally, a metal closure plug engaging said internal screw-thread in a fluid-tight manner, said plug having a hexagonal sectioned extension on one end thereof and being bored from the other end to within the said extension, and said extension being undercut next the plug to form a thin neck portion whereby the extension is connected to the plug, an internally screw-threaded sleeve member engaging said external screw-thread on said boss, a discharge nozzle pipe connected to said sleeve member, a screw-threaded closure member for said sleeve, a concentric boss in said closure member, a concentric screw-threaded bore in said boss, a screw-threaded stem engaging said bore, a handle secured on the external end of said stem and a fracturing head secured on the internal end of said stem, said fracturing head including a hexagonal sectioned recess extending from the lower end of said head for accommodating the closure plug extension and a lower end face adapted to engage the upper end face of the closure plug after severance of the extension thereon in a fluid-tight manner to reseal the container.

4. Stoppering device for a container, comprising a cap for the mouth of the container, a concentric boss on said cap screw-threaded externally, a screw-threaded concentric bore in said boss, a screw-threaded metal closure plug engaging said bore, a V-sectioned flange on said plug, a corresponding inverted V-sectioned rim on said boss, a washer interposed between said flange and said rim to provide a fluid-tight connection between said plug and said boss, a hexagonal sectioned extension on said plug at the upper end thereof, a bore in said plug extending from the lower end thereof to within said extension, a groove in said extension adjacent the body of said plug having sides extending in an inclined direction to the axis of the plug and a cylindrical bottom concentric with the plug and forming a thin metal neck portion connecting said extension to the body of the plug in a fluid-tight manner, an internally screw-threaded sleeve member engaging said external screw-thread on said boss, a discharge nozzle pipe projecting radially from said sleeve member and communicating with the interior thereof, a screw-threaded closure member for said sleeve, a concentric boss in said closure member, a concentric screw-threaded bore in said boss, a screw-threaded stem engaging said bore, a handle secured on the external end of said stem, and a fracturing head secured on the internal end of said stem within the sleeve member, a hexagonal sectioned elongated recess in said fracturing head extending from the lower end of said head for accommodating the closure plug extension with axial clearance in a manner whereby it may be rotated by said head to sever it from the body of the plug and after severance be forced by the fluid pressure into said recess out of contact with the body of said plug, and a coned lower end face on said fracturing head adapted after severance of the plug extension to engage the upper inwardly coned end face of the closure plug in a fluid-tight manner to reseal the container.

5. Stoppering device for a container, comprising a cap for the mouth of the container, an externally screw-threaded concentric boss on said cap, a concentric bore in said boss, a closure plug engaging said bore in a fluid-pressure-tight manner, a hexagonal sectioned extension on said plug at the upper end thereof, a bore in said plug extending from the lower end thereof to within said extension, a groove in said extension adjacent the body of said plug forming a thin metal neck portion connecting said extension to the body of the plug in a fluid-tight manner, an internally screw-threaded sleeve member engaging said external screw-thread on said boss, a gland rotatably mounted in a fluid-tight manner at the other end of said sleeve, and closing said end of said sleeve, a handle on the exterior of said gland, a fracturing head secured to the interior of said gland, a hexagonal sectioned recess concentric in said fracturing head, extending from the lower end of said head for accommodating the hexagonal sectioned extension on said plug and thereby to rotate said extension and sever it from the body of the plug, and a discharge nozzle pipe projecting from said sleeve member and communicating with the interior thereof, and serving as a handle whereby said sleeve member may be rotated after fracture of said plug to move said extension into engagement with the body of the plug and in combination with said handle, score said fractured parts of said plug together to reclose said container in a fluid-tight manner.

6. Stoppering device for a container, comprising a cap for the mouth of the container, a concentric hollow boss on said cap screw-threaded internally and externally, a metal closure plug engaging said internal screw-thread in a fluid-tight manner, said plug having a hexagonal sectioned extension on one end thereof and being bored from the other end to within said extension and said extension being undercut adjacent the plug to form a thin neck portion connecting said extension with the body of the plug, an internally screw-threaded sleeve member engaging said external screw-thread on said boss, a discharge nozzle pipe connected to said sleeve member and communicating with the interior thereof, a screw-threaded closure member for said sleeve member, a concentric boss in said closure member, a concentric screw-threaded bore in said boss, a screw-threaded stem engaging said bore, a handle secured on the external end of said stem, a fracturing head secured on the internal end of said stem, and a hexagonal sectioned recess extending from the lower end of said head for accommodating said closure plug extension, whereby said extension may be twisted off from said plug to open the container, and thereafter screwed down to bring the fractured portions of the plug together and scored into one another to reseal the container in a fluid-tight manner.

HUBERT MACKENZIE SALMOND.
ANDERS MATHISEN.